US011927323B2

(12) United States Patent
Tang et al.

(10) Patent No.: US 11,927,323 B2
(45) Date of Patent: Mar. 12, 2024

(54) ZOOM DEVICE AND LIGHTING DEVICE

(71) Applicant: APUTURE IMAGING INDUSTRIES CO., LTD., Guangdong (CN)

(72) Inventors: Rong Tang, Guangdong (CN); Daoyou Peng, Guangdong (CN)

(73) Assignee: Aputure Imaging Industries Co., Ltd., Guangdong (CN)

( * ) Notice: Subject to any disclaimer, the term of this patent is extended or adjusted under 35 U.S.C. 154(b) by 240 days.

(21) Appl. No.: 17/564,432

(22) Filed: Dec. 29, 2021

(65) Prior Publication Data

US 2023/0099094 A1 Mar. 30, 2023

(30) Foreign Application Priority Data

Sep. 26, 2021 (CN) .......................... 202111128086.2

(51) Int. Cl.
*F21V 14/06* (2006.01)
*F21W 131/406* (2006.01)

(52) U.S. Cl.
CPC ....... *F21V 14/06* (2013.01); *F21W 2131/406* (2013.01)

(58) Field of Classification Search
CPC .......................... F21V 14/06; F21W 2131/406
See application file for complete search history.

(56) References Cited

U.S. PATENT DOCUMENTS

| | | | | |
|---|---|---|---|---|
| 4,101,957 A * | 7/1978 | Chang | A61B 1/00188 | 426/433 |
| 11,193,653 B1 * | 12/2021 | Dijkstra | F21V 15/015 | |
| 11,686,445 B1 * | 6/2023 | Pan | F21V 14/06 | 362/269 |

(Continued)

FOREIGN PATENT DOCUMENTS

| | | |
|---|---|---|
| CN | 102840552 A | 12/2012 |
| CN | 104238093 A | 12/2014 |

(Continued)

OTHER PUBLICATIONS

The First Office Action and Search Report dated Nov. 10, 2021, for Aputure Imaging Industries Co., Ltd., from China Application No. 202111128086.2 and Its Translation of Office Action Into English (6 pages).

*Primary Examiner* — Julie A Bannan
(74) *Attorney, Agent, or Firm* — Mark M. Friedman

(57) ABSTRACT

The present disclosure provides a zoom device and a lighting device. The zoom device includes a first lens assembly, a connecting frame, a first gear assembly, a second gear assembly and a third gear assembly. The second gear assembly and the third gear assembly mesh with the first gear assembly and connect with the first lens assembly and the connecting frame respectively, the first lens assembly is disposed between the first lens assembly and the connecting frame, and is configured to drive the second gear assembly and the third gear assembly to adjust a distance between the first lens assembly and the connecting frame. When focusing, mechanisms located on two sides of the first gear extend and contract synchronously, a focusing distance is increased, a problem of focus lags is alleviated, fluency and efficiency is improved, and the zoom device is suitable for focusing processing of large-size lighting devices.

20 Claims, 14 Drawing Sheets

(56) References Cited

U.S. PATENT DOCUMENTS

| | | | | |
|---|---|---|---|---|
| 2007/0223110 | A1* | 9/2007 | Ge | G02B 13/001 359/699 |
| 2012/0121244 | A1* | 5/2012 | Stavely | G02B 3/08 362/232 |
| 2017/0268748 | A1* | 9/2017 | Jorgensen | H05B 45/00 |

FOREIGN PATENT DOCUMENTS

| | | | | |
|---|---|---|---|---|
| CN | 204420863 U | | 6/2015 | |
| CN | 206540082 U | | 10/2017 | |
| CN | 208780966 U | | 4/2019 | |
| CN | 210979512 U | | 7/2020 | |
| CN | 212960994 U | | 4/2021 | |
| WO | WO-2013027852 A1 | * | 2/2013 | B60Q 3/0279 |

* cited by examiner

ZOOM DEVICE AND LIGHTING DEVICE

FIELD OF INVENTION

The present disclosure generally relates to a field of lighting technology, in particular to a zoom device and a lighting device.

BACKGROUND OF INVENTION

In creative processes of television drama, advertisement, and video, it is often necessary to use lighting devices to supply light. Because the light output effect of a light body of the lighting device is limited, for example, a single light output effect such as an overly small or overly large light output angle cannot satisfy needs of supplementing light in various scenes, therefore it is needed to dispose additional accessories on a light output side of the light body. The accessories may be a focusing cylinder equipped with a Fresnel lenses or other condenser lenses. Different effects of light control of the lighting device can be achieved by adjusting the accessories.

With the improvement of large production scenes, needs of light distributing with greater brightness and illumination are also growing, so requirements of power of the lighting device are also higher. Due to requirements of various properties such as heat dissipation, drive, etc., the lighting device with high power will increase a structure of a whole machine of the lighting device, and the accessories (focusing cylinder, etc.) installed on the lighting device also need to be adjusted (increased) accordingly. However, the focusing cylinder applied to a large light body currently is transformed through size amplification based on the design characteristics of a small light body and thus requires a user to exert greater force to operate the focusing cylinder, and focus lags easily occur during a focusing process, which seriously affects use efficiency of the user.

Therefore, the current zoom device has a technical problem of focus lags occurred during the focusing process.

SUMMARY OF INVENTION

The present disclosure provides a zoom device and a lighting device, which are configured to alleviate a technical problem of focus lags occurred during a focusing process of current zoom devices.

The present disclosure provides a zoom device, comprising a light output side, wherein the zoom device comprises:

a first lens assembly disposed close to the light output side;

a connecting frame disposed at a side of the first lens assembly away from the light output side;

a first gear assembly disposed between the first lens assembly and the connecting frame, wherein the first gear assembly comprises a light transmitting area in communication with the light output side;

a second gear assembly disposed at a side of the first gear assembly facing the light transmitting area, wherein the second gear assembly meshes with the first gear assembly, and the second gear assembly is further connected with the first lens assembly; and a third gear assembly disposed at a side of the first gear assembly facing the light transmitting area, wherein the third gear assembly meshes with the first gear assembly, and the third gear assembly is further connected with the connecting frame;

wherein the third gear assembly and the second gear assembly are disposed at interval along a circumferential direction of the first gear assembly, and the first gear assembly is configured to drive the second gear assembly and the third gear assembly to adjust a distance between the first lens assembly and the connecting frame.

Wherein, the first gear assembly comprises an annular first gear, and the first gear is an internal gear;

the second gear assembly comprises a second gear and a first transmission rod rotatably connected with second gear, an end of the first transmission rod is fixedly connected with the first lens assembly, and the second gear meshes with the first gear;

the third gear assembly comprises a third gear and a second transmission rod fixedly connected with the third gear; the connecting frame comprises a transmission part, the second transmission rod is rotatably connected with the transmission part; the third gear meshes with the first gear; and the second gear and the third gear are disposed at interval along a circumferential direction of the first gear and are both external gears.

Wherein, a surface of the second gear in contact with the first transmission rod is provided with a first internal thread, a surface of the first transmission rod in contact with the second gear is provided with a first external thread, the first internal thread matches the first external thread;

a surface of the transmission part in contact with the second transmission rod is provided with a second internal thread, a surface of the second transmission rod in contact with the transmission part is provided with a second external thread, and the second internal thread matches the second external thread; and a rotating direction of the first internal thread is opposite to a rotating direction of the second internal thread.

Wherein, the first gear assembly further comprises a first limiting frame and a second limiting frame, wherein the first limiting frame and the second limiting frame are disposed on opposite sides of the first gear, and the first gear is rotatably connected with the first limiting frame and the second limiting frame, respectively.

Wherein, a side of the first limiting frame facing the first gear is provided with a first groove, a side of the first gear facing the first limiting frame is provided with a first follower, and the first follower is disposed in the first groove; and a side of the second limiting frame facing the first gear is provided with a second groove, a side of the first gear facing the second limiting frame is provided with a second follower, and the second follower is disposed in the second groove.

Wherein, the first follower comprises a bearing, and a bearing surface of the first follower is in contact with a side surface of the first groove close to the first gear; and the second follower comprises a bearing, and a bearing surface of the second follower is in contact with a side surface of the second groove close to the first gear.

Wherein, the zoom device further comprises an adjusting sleeve, a first housing, and a second housing;

the adjusting sleeve is disposed around an outer circumferential surface of the first gear and is fixedly connected with the first gear; and the first housing is fixedly connected with the second limiting frame, the second housing is fixedly connected with the connecting frame; the connecting frame is located inside the second housing, the first housing is located outside the second housing, and there is a gap between the first housing and the second housing.

Wherein, a surface of the adjusting sleeve away from the first gear is provided with a plurality of large protrusions and a plurality of small protrusions, a plurality of small protrusions is disposed between every two adjacent large protrusions, and a height of the large protrusion is greater than a height of the small protrusion.

Wherein, the first lens assembly comprises a first lens and a first lens frame fixedly connected with the first lens, and the first transmission rod is fixedly connected with the first lens frame.

Wherein, the zoom device further comprises a light-shading assembly disposed between the first lens assembly and the first gear assembly, the light-shading assembly is circumferentially disposed along an edge of the first lens, an end of the light-shading assembly is fixedly connected with the first lens frame, and another end of the light-shading assembly extends into an inner side of the first gear assembly.

Wherein, the zoom device further comprises a second lens assembly fixedly connected with the connecting frame and a clamping seat, the second lens assembly is disposed in a center of the connecting frame, the clamping seat is connected with the connecting frame or the second lens assembly, the clamping seat is located on a side of the second lens assembly away from the first lens assembly, and the clamping seat is configured to be connected with a light body.

Wherein, the second lens assembly comprises a first convex lens and a second convex lens, a radius of the first convex lens is greater than a radius of the second convex lens, and the first convex lens and the second convex lens are arranged sequentially along a direction from the first lens assembly to the clamping seat.

Wherein, the zoom device includes a plurality of the second gear assemblies and a plurality of the third gear assemblies, and the plurality of second gear assemblies and the plurality of third gear assemblies are alternately disposed at intervals on the circumferential direction of the first gear assembly.

The present disclosure further provides a lighting device comprising a zoom device and a light body fixedly connected with the zoom device, the zoom device comprises a light output side, and a light output terminal of the light body faces the light output side of the zoom device, wherein the zoom device comprises:

a first lens assembly disposed close to the light output side;

a connecting frame disposed at a side of the first lens assembly away from the light output side;

a first gear assembly disposed between the first lens assembly and the connecting frame, wherein the first gear assembly comprises a light transmitting area in communication with the light output side;

a second gear assembly disposed at a side of the first gear assembly facing the light transmitting area, wherein the second gear assembly meshes with the first gear assembly, and the second gear assembly is further connected with the first lens assembly; and a third gear assembly disposed at a side of the first gear assembly facing the light transmitting area, wherein the third gear assembly meshes with the first gear assembly, and the third gear assembly is further connected with the connecting frame;

wherein the third gear assembly and the second gear assembly are disposed at interval along a circumferential direction of the first gear assembly, and the first gear assembly is configured to drive the second gear assembly and the third gear assembly to adjust a distance between the first lens assembly and the connecting frame.

Wherein, the first gear assembly comprises an annular first gear, and the first gear is an internal gear;

the second gear assembly comprises a second gear and a first transmission rod rotatably connected with second gear, an end of the first transmission rod is fixedly connected with the first lens assembly, and the second gear meshes with the first gear;

the third gear assembly comprises a third gear and a second transmission rod fixedly connected with the third gear; the connecting frame comprises a transmission part, the second transmission rod is rotatably connected with the transmission part; the third gear meshes with the first gear;

the second gear and the third gear are disposed at interval along a circumferential direction of the first gear and are both external gears;

a surface of the second gear in contact with the first transmission rod is provided with a first internal thread, a surface of the first transmission rod in contact with the second gear is provided with a first external thread, the first internal thread matches the first external thread;

a surface of the transmission part in contact with the second transmission rod is provided with a second internal thread, a surface of the second transmission rod in contact with the transmission part is provided with a second external thread, and the second internal thread matches the second external thread; and a rotating direction of the first internal thread is opposite to a rotating direction of the second internal thread.

Wherein, the first gear assembly further comprises a first limiting frame and a second limiting frame, wherein the first limiting frame and the second limiting frame are disposed on opposite sides of the first gear, and the first gear is rotatably connected with the first limiting frame and the second limiting frame, respectively;

a side of the first limiting frame facing the first gear is provided with a first groove, a side of the first gear facing the first limiting frame is provided with a first follower, and the first follower is disposed in the first groove;

a side of the second limiting frame facing the first gear is provided with a second groove, a side of the first gear facing the second limiting frame is provided with a second follower, and the second follower is disposed in the second groove;

the first follower comprises a bearing, and a bearing surface of the first follower is in contact with a side surface of the first groove close to the first gear; and the second follower comprises a bearing, and a bearing surface of the second follower is in contact with a side surface of the second groove close to the first gear.

Wherein, the zoom device further comprises an adjusting sleeve, a first housing, and a second housing;

the adjusting sleeve is disposed around an outer circumferential surface of the first gear and is fixedly connected with the first gear;

the first housing is fixedly connected with the second limiting frame, the second housing is fixedly connected with the connecting frame; the connecting frame is located inside the second housing, the first housing is located outside the second housing, and there is a gap between the first housing and the second housing; and a surface of the adjusting sleeve away from the first gear is provided with a plurality of large protrusions and a plurality of small protrusions, a plurality of small protrusions is disposed between every two adjacent large protrusions, and a height of the large protrusion is greater than a height of the small protrusion.

Wherein, the first lens assembly comprises a first lens and a first lens frame fixedly connected with the first lens, and the first transmission rod is fixedly connected with the first lens frame; and the zoom device further comprises a light-shading assembly disposed between the first lens assembly and the first gear assembly, the light-shading assembly is circumferentially disposed along an edge of the first lens, an end of the light-shading assembly is fixedly connected with the first lens frame, and another end of the light-shading assembly extends into an inner side of the first gear assembly.

Wherein, the zoom device further comprises a second lens assembly fixedly connected with the connecting frame and a clamping seat, the second lens assembly is disposed in a center of the connecting frame, the clamping seat is connected with the connecting frame or the second lens assembly, the clamping seat is located on a side of the second lens assembly away from the first lens assembly, and the clamping seat is configured to be connected with a light body; and the second lens assembly comprises a first convex lens and a second convex lens, a radius of the first convex lens is greater than a radius of the second convex lens, and the first convex lens and the second convex lens are arranged sequentially along a direction from the first lens assembly to the clamping seat.

Wherein, the zoom device includes a plurality of the second gear assemblies and a plurality of the third gear assemblies, and the plurality of second gear assemblies and the plurality of third gear assemblies are alternately disposed at intervals on the circumferential direction of the first gear assembly.

Beneficial effects of the present disclosure are: the present disclosure provides a zoom device and a lighting device, the zoom device includes a first lens assembly, a connecting frame, a first gear assembly disposed between the first lens assembly and the connecting frame, a second gear assembly disposed between the first lens assembly and the first gear assembly, a third gear assembly disposed between the first lens assembly and the connecting frame. The second gear assembly and the third gear assembly are located inside the first lens assembly, the second gear assembly is connected with the first lens assembly, and the third gear assembly is connected with the connecting frame. The first gear assembly meshes with the second gear assembly and the third gear assembly to drive the second assembly and the third gear assembly at a same time, so as to realize a distance adjustment between the first lens assembly and the connecting frame. During the focusing process of the zoom device, mechanisms located on two sides of the first gear extend and contract synchronously, a focusing distance of the zoom device is increased, focus lags during the focusing process of the large volume zoom device is alleviated, and fluency and efficiency of focusing is improved through cooperation of gears, so that the zoom device is suitable for focusing processing of large-size lighting devices.

DESCRIPTION OF DRAWINGS

Technical solution and other beneficial effects of the present disclosure will be obviously through the detailed description of the specific embodiment of the present disclosure in combination with drawings.

Figure 1:
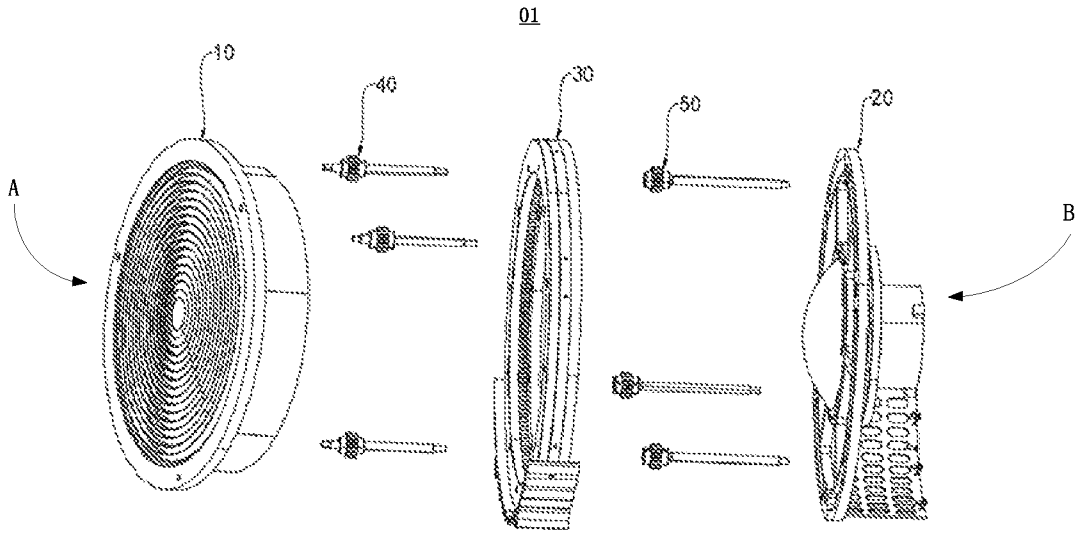
FIG. 1 is a partial explosion schematic diagram of a zoom device provided by an embodiment of the present disclosure.

Zoom device 01, first lens assembly 10, connecting frame 20, first gear assembly 30, second gear assembly 40, third gear assembly 50, light output side A, light input side B, light transmitting area L, first lens 101, first lens frame 102, light-shading assembly 103, second gear 401, first transmission rod 402, first hole K1, first gear 301, first limiting frame 302, second limiting frame 303, adjusting sleeve 304, third gear 501, second transmission rod 502, second hole K2, transmission part 503, third hole K3, first housing S1, second housing S2, second lens assembly 60, clamping seat 70, first convex lens 602, second convex lens 604, second lens frame 601, third lens frame 603, bayonet 701, first groove 3021, first follower 305, second groove 3031, second follower 306, lighting device 200, light body 02.

DETAILED DESCRIPTION OF PREFERRED EMBODIMENTS

Technical solutions in embodiments of the present disclosure will be described clearly and completely in combination with the drawings in the embodiments of the present disclosure. Obviously, the embodiments described are only part of the embodiments of the present disclosure, not all embodiments. According to the embodiments in the present disclosure, all other embodiments obtained by those of skill in the art that the embodiments described herein without making creative work belong to the protection scope of the present disclosure.

Referring to FIG. 1 to FIG. 17, FIG. 1 is a partial explosion schematic diagram of a zoom device 01 provided by an embodiment of the present disclosure. It should be understood that, in order to facilitate description and understanding, and enable users to see internal relevant components more clearly, the explosion schematic diagram omits a part of components to expose internal components, but it should not be understood that an actual product is like this. The zoom device 01 includes a first lens assembly 10, a connecting frame 20, a first gear assembly 30, a second gear assembly 40, and a third gear assembly 50. Moreover, the second gear assembly 40 is disposed between the first lens assembly 10 and the first gear assembly 30. The second gear assembly 40 is connected with the first gear assembly 30, and a gear of the second gear assembly 40 and a gear of the first gear assembly 30 mesh with each other. The second gear assembly 40 is further connected with the first lens assembly 10. The second gear assembly 40 is configured to realize distance adjustment between the first lens assembly 10 and the first gear assembly 30, for example, the first lens assembly 10 gradually approaches or gradually moves away from the first gear assembly 30. The third gear assembly 50 is disposed between the first gear assembly 30 and the connecting frame 20, the third gear assembly 50 is connected with the first gear assembly 30, and a gear of the third gear assembly 50 and a gear of the first gear assembly 30 mesh with each other. The third gear assembly 50 is further connected with the connecting frame 20. The third gear assembly 50 is configured to realize distance adjustment between the first gear assembly 30 and the connecting frame 20, for example, the connecting frame 20 gradually approaches or gradually moves away from the first gear assembly 30. The zoom device 01 includes a light output side A, and the light output side A is a side of the first lens assembly 10 away from the first gear assembly 30, in other words, the first lens assembly 10 is disposed close to the light output side A. The first gear assembly 30 includes a light transmitting area L in communication with the light output side A. It can be understood that, the first gear assembly 30 may be annular, a center of the first gear assembly 30 is hollow to form the light transmitting area L, and light can be irradiated to the light output side A from the light transmitting area L. The second gear assembly 40 and the third gear assembly 50 are simultaneously disposed on a circumferential inner side of the first gear assembly 30, that is, a side facing the light transmitting area L. The third gear assembly 50 and the second gear assembly 40 are disposed at interval along a circumferential direction of the first gear assembly 30, and the first gear assembly 30 is configured to drive the second gear assembly 40 and the third gear assembly 50 to adjust a distance between the first lens assembly 10 and the connecting frame 20. Since the second gear assembly 40 is fixedly connected with the first lens assembly 10 and is located at a first end of the first gear assembly 30, the second gear assembly 40 meshes with the first gear assembly 30, the third gear assembly 50 is fixedly connected with the connecting frame 20 and is located at a second end of the first gear assembly 30, the first end and the second end are opposite ends of the first gear assembly 30, and the third gear assembly 50 meshes with the first gear assembly 30, therefore, when the first gear assembly 30 is rotated along a first direction, it will drive the second gear assembly 40 and the third gear assembly 50 to rotate at a same time, thus to drive the first lens assembly 10 and the connecting frame 20 to approach each other. When the first gear assembly 30 is rotated along a second direction, it will drive the second gear assembly 40 and the third gear assembly 50 to rotate at a same time, thus to drive the first lens assembly 10 and the connecting frame 20 to move away from each other. Wherein, the second direction is opposite to the first direction, for example, one of the first direction and the second direction is clockwise, and another one of the first direction and the second direction is anti-clockwise.

Figure 2:
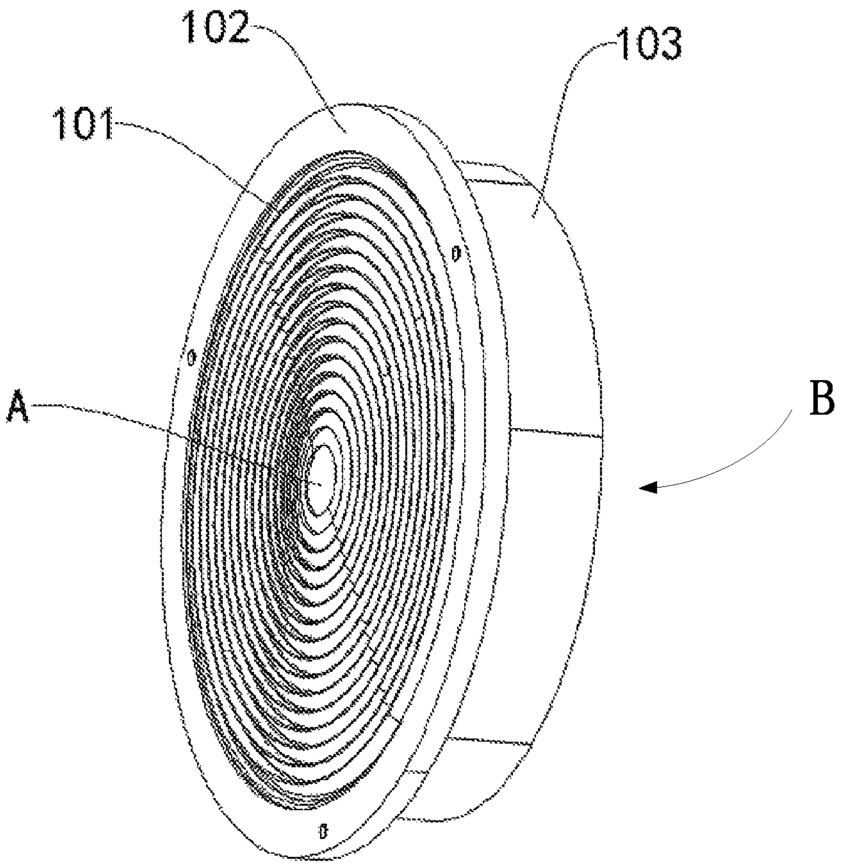
FIG. 2 is a structural schematic diagram of a first lens assembly provided by an embodiment of the present disclosure.

Specifically, referring to FIG. 2, the FIG. 2 is a structural schematic diagram of a first lens assembly 10 provided by an embodiment of the present disclosure. The first lens assembly 10 includes a first lens 101 and a first lens frame 102 fixedly connected with the first lens 101. The first lens 101 may be circular lens or elliptical lens. The first lens frame 102 includes a central through hole, the first lens 101 may be disposed inside the through hole, thus to allow the first lens assembly 10 to output light. The first lens frame 102 may be circumferentially disposed along an edge of the first lens 101. The first lens frame 102 is configured to fix and protect the edge of the first lens 101, and to realize connection of the first lens 101 with other components.

Alternatively, the first lens 101 may be a lens which can adjust a direction of light emission, for example, a fresnel lens with focusing function. Of course, the first lens 101 may also be an optical lens with a condensing function or a light softing function, such as a planoconvex lens, a diffuser, a compound eye, etc.

The zoom device 01 includes the light output side A and a light input side B opposite to the light output side A. Light of a light body can enter the zoom device 01 from the light input side B and be output from the light output side A. A light output surface of the first lens 101 faces the light output side A, and the first gear assembly 30 and the connecting frame 20 are disposed at a side of the first lens assembly 10 away from the light output side A, that is, the first gear assembly 30 and the connecting frame 20 are disposed at the light input side B of the first lens assembly 10.

Alternatively, the zoom device 01 further includes a light-shading assembly 103 disposed between the first lens 101 and the first gear assembly 30. The light-shading assembly 103 is circumferentially disposed around the edge of the first lens 101 and extends in a direction away from the first lens 101. An end of the light-shading assembly 103 is fixedly connected with the first lens frame 102, and another end of the light-shading assembly 103 extends into an inner side of the first gear assembly 30. The light-shading assembly 103 may be made of a flexible material, therefore, when the zoom device 01 is in a contracted state, the light-shading assembly 103 is folded between the first lens 101 and the first gear assembly 30. The light-shading assembly 103 may also be made of a hard material, at this time, when the zoom device 01 is in a contracted state, the light-shading assembly 103 retracts into an inner space of the zoom device 01.

Figure 3:
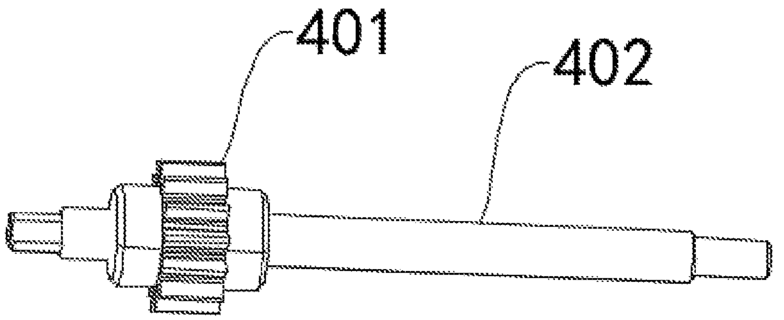
FIG. 3 is a structural schematic diagram of a second gear assembly provided by an embodiment of the present disclosure.
Figure 4:
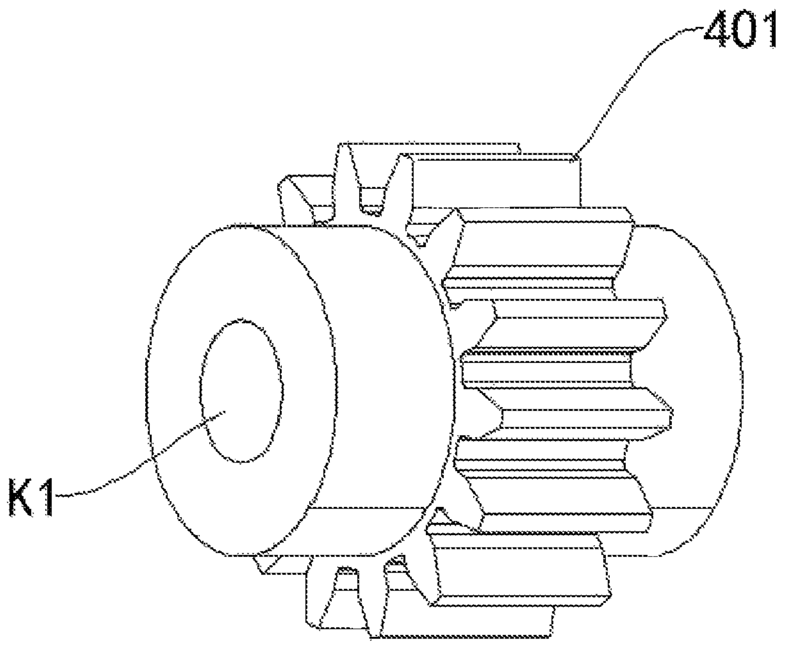
FIG. 4 is a structural schematic diagram of a second gear provided by an embodiment of the present disclosure.

Referring to FIG. 3 and FIG. 4, the FIG. 3 is a structural schematic diagram of a second gear assembly 40 provided by an embodiment of the present disclosure, and the FIG. 4 is a structural schematic diagram of a second gear 401 provided by an embodiment of the present disclosure. The second gear assembly 40 includes the second gear 401 and a first transmission rod 402 rotatably connected with second gear 401. An end of the first transmission rod 402 is fixedly connected with the first lens assembly 10, and specifically fixedly connected with the first lens frame 102 of the first lens assembly 10. The second gear 401 is cooperatively connected with the first gear assembly 30.

Further, the second gear 401 is an external gear, an interior of the second gear 401 includes a circular first hole K1, and the first transmission rod 402 penetrates the first hole K1. A surface of the second gear 401 in contact with the first transmission rod 402 is provided with a first internal thread, a surface of the first transmission rod 402 in contact with the second gear 401 is provided with a first external thread, the first internal thread matches the first external thread, so as to realize a rotation connection between the second gear 401 and the first transmission rod 402, and during rotation, shuttle movement of the first transmission rod 402 in the first hole K1 can be realized through thread-transmission fitting relationship between the second gear 401 and the first transmission rod 402, thereby driving the first lens assembly 10 to move away from or approach the first gear assembly 30.

Figure 5:
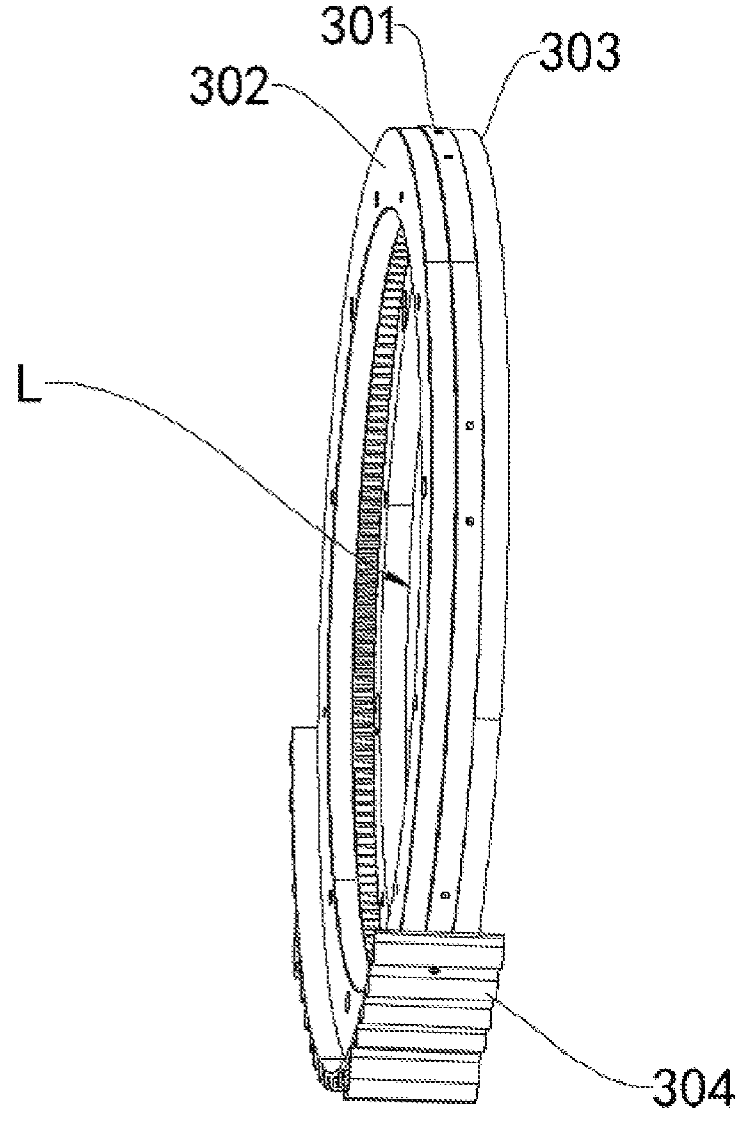
FIG. 5 is a structural schematic diagram of a first gear assembly provided by an embodiment of the present disclosure.

Referring to FIG. 5, FIG. 5 is a structural schematic diagram of a first gear assembly 30 provided by an embodiment of the present disclosure. The first gear assembly 30 includes a first gear 301, a first limiting frame 302, and a second limiting frame 303. The first limiting frame 302 and the second limiting frame 303 are disposed on opposite sides of the first gear 301. The first gear 301 is rotatably connected with the first limiting frame 302 and the second limiting frame 303 respectively, that is, the first gear 301 can rotate between the first limiting frame 302 and the second limiting frame 303.

The first gear 301 has a circular ring structure, a cavity surrounded by the first gear 301 is the light transmitting area L, and light enters the cavity through the light input side B, passes through the light transmitting area L, and emits to the light output side A. Specifically, the first gear 301 is an internal gear, a tooth structure of the first gear 301 faces the light transmitting area L. The first gear 301 and the second gear 401 implement transmission by means of meshing.

Alternatively, the first gear assembly 30 further includes an adjusting sleeve 304 fixedly connected with the first gear 301. The adjusting sleeve 304 is disposed around an outer circumferential surface of the first gear 301. A surface of the adjusting sleeve 304 away from the first gear 301 is provided with a plurality of large protrusions T1 and a plurality of small protrusions T2, and a plurality of small protrusions T2 is disposed between every two adjacent large protrusions T1. A height of the large protrusion T1 is higher than a height of the small protrusion T2, and a height of the large protrusion T1 protruding from the outer circumferential surface of the first gear 301 is greater than a height of the small protrusion T2 protruding from the outer circumferential surface of the first gear 301. Moreover, the plurality of large protrusions T1 may be equally spaced on the outer circumferential surface of the first gear 301, and the plurality of small protrusions T2 disposed between every two adjacent large protrusions T1 may be equally spaced on the outer circumferential surface of the first gear 301, too. Alternatively, the large protrusion T1 may be a strip-shaped protrusion or an arc-shaped protrusion, and the small protrusion T2 may be a strip-shaped protrusion or an arc-shaped protrusion. The plurality of large protrusions T1 and the plurality of small protrusions T2 disposed on the adjusting sleeve 304 are configured to facilitate a user applying a rotating force to the first gear 301. It can be understood that, because a volume of the zoom device 01 is greater, larger force is needed when adjusting the zoom device 01, so that a part of the user's hand may abut against the plurality of large protrusions T1, and another part may abut against the plurality of small protrusions T2, so as to greatly improve friction during adjusting.

Figure 6:
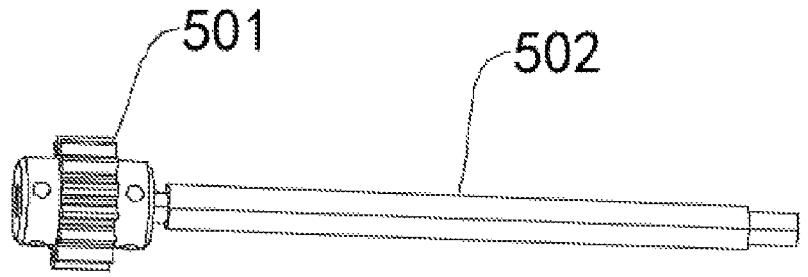
FIG. 6 is a structural schematic diagram of a third gear assembly provided by an embodiment of the present disclosure.
Figure 7:
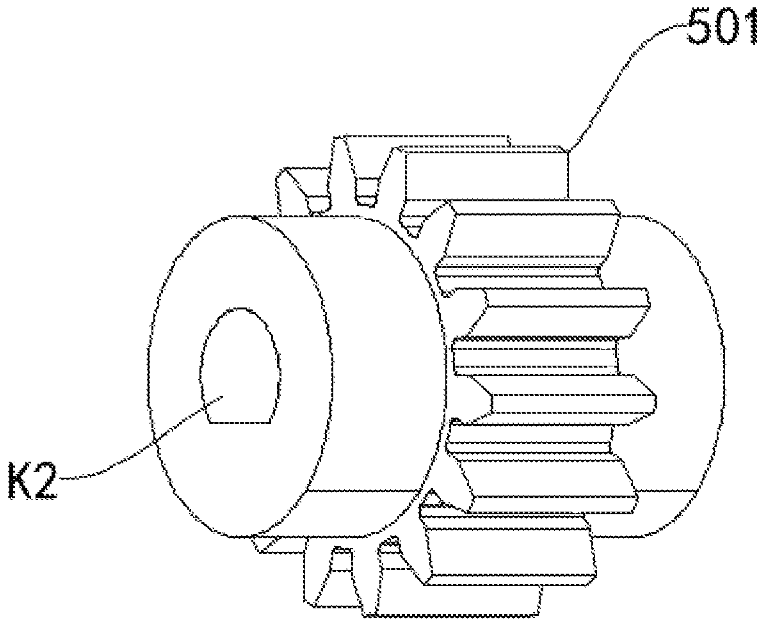
FIG. 7 is a structural schematic diagram of a third gear provided by an embodiment of the present disclosure.

Referring to FIG. 6 and FIG. 7, FIG. 6 is a structural schematic diagram of a third gear assembly 50 provided by an embodiment of the present disclosure, and FIG. 7 is a structural schematic diagram of a third gear 501 provided by an embodiment of the present disclosure. The third gear assembly 50 includes the third gear 501 and a second transmission rod 502. The third gear 501 are fixedly connected with the second transmission rod 502. The third gear 501 is an external gear. The third gear 501 and the first gear 301 implement transmission by means of meshing.

Alternatively, the third gear 501 includes a second hole K2. The second hole K2 is a non-circumferential hole, an end of the second transmission rod 502 is provided with a non-circumferential surface matched with the second hole K2, the second transmission rod 502 penetrates the second hole K2 to realize fixed connection, and the second transmission rod 502 is not rotatable relative to the third gear 501.

Figure 8:
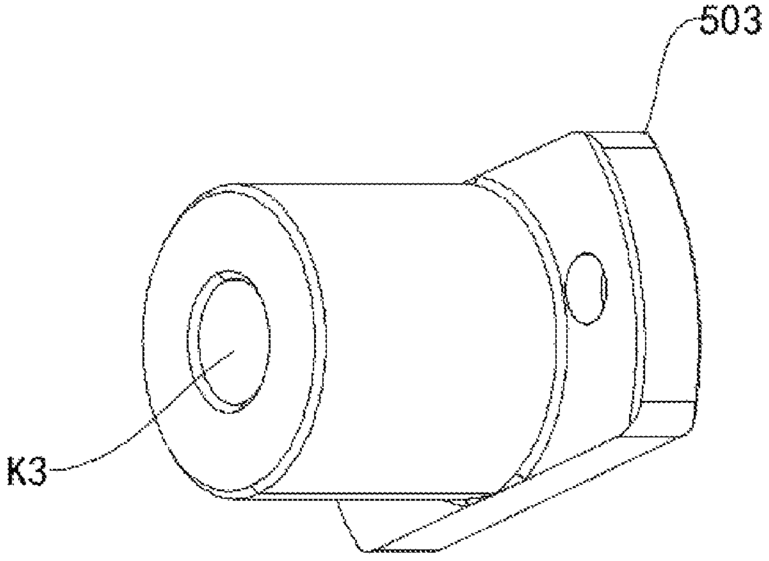
FIG. 8 is a structural schematic diagram of a transmission part connected with a connecting frame provided by an embodiment of the present disclosure.
Figure 9:
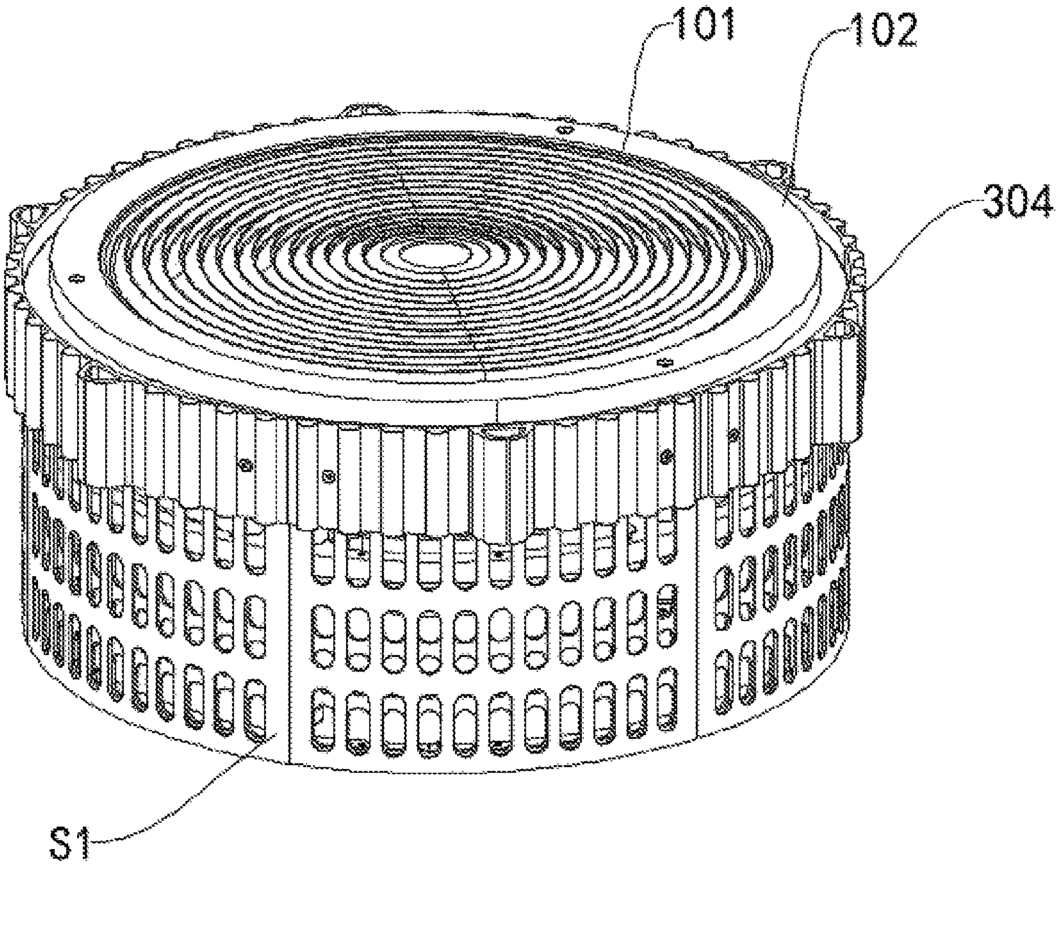
FIG. 9 is a first view of a zoom device in a contracted state provided by an embodiment of the present disclosure.

Referring to FIG. 8, FIG. 8 is a structural schematic diagram of a transmission part 503 connected with the connecting frame 20 provided by an embodiment of the present disclosure. An end of the second transmission rod 502 away from the third gear 501 is rotatably connected with the transmission part 503 of the connecting frame 20. Specifically, the transmission part 503 includes a circular third hole K3, and the second transmission rod 502 penetrates the third hole K3. A surface of the transmission part 503 in contact with the second transmission rod 502 is provided with second internal thread, a surface of the second transmission rod 502 in contact with the transmission part 503 is provided with a second external thread, and the second internal thread matches the second external thread so as to realize a rotation connection between the transmission part 503 and the second transmission rod 502, and during rotation, shuttle movement of the second transmission rod 502 in the third hole K3 through thread-transmission fitting relationship between the transmission part 503 and the second transmission rod 502, thereby driving the connecting frame 20 to move away from or approach to the first gear assembly 30.

Moreover, a thread rotating direction of the above internal thread and external thread exists as a following relationship: a rotating direction of the first internal thread is opposite to that of the second internal thread, a rotating direction of the first external thread is opposite to a rotating direction of the second external thread, and a rotating direction of the first internal thread is same with that of the first external thread, a rotating direction of the second internal thread is same with that of the second external thread, thereby realizing that mechanisms on both sides of the first gear assembly 30 extend and contract synchronously during rotation of the first gear 301.

Alternatively, the rotating direction of the first internal thread and the rotating direction of the first external thread are both dextral, and the rotating direction of the second internal thread and the rotating direction of the second external thread are both sinistral.

Figure 10:
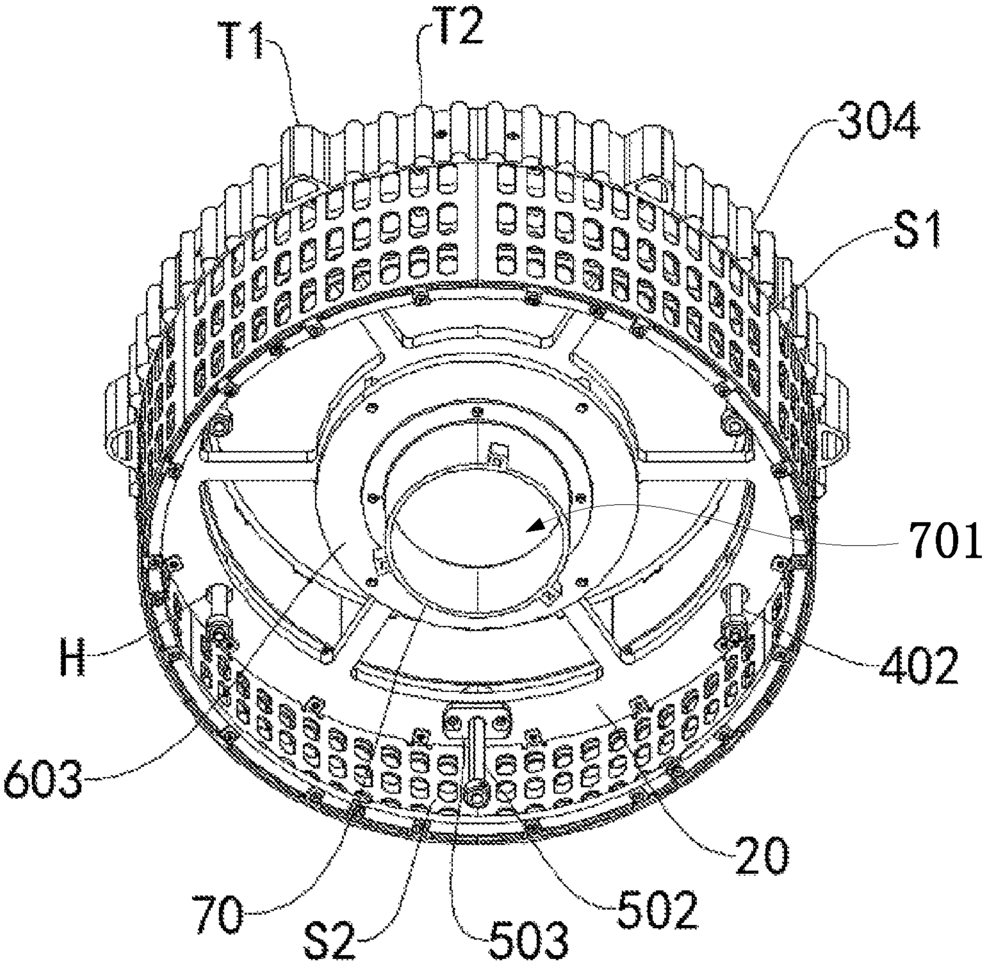
FIG. 10 is a second view of a zoom device in a contracted state provided by an embodiment of the present disclosure.
Figure 11:
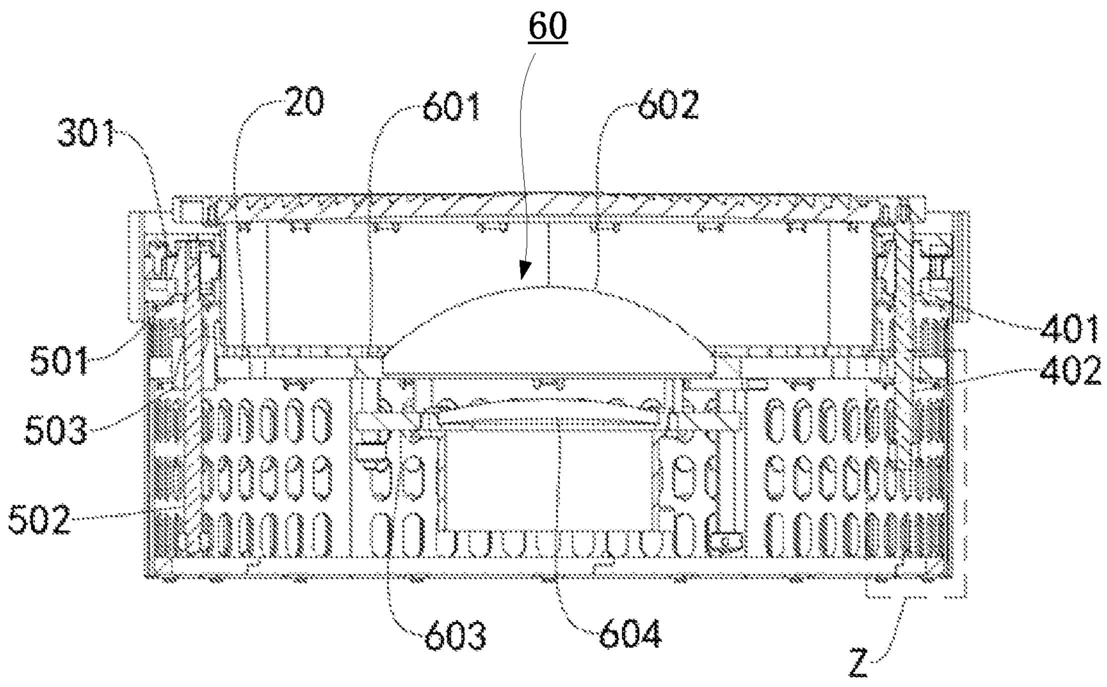
FIG. 11 is a sectional view of a zoom device in a contracted state provided by an embodiment of the present disclosure.
Figure 12:
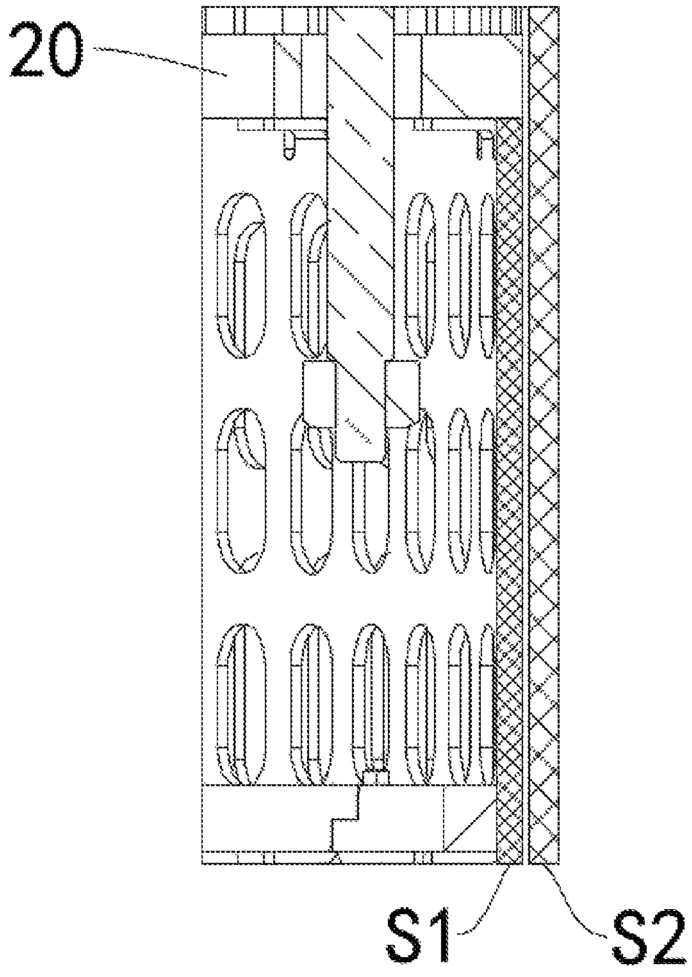
FIG. 12 is a partial enlarged diagram of a zone Z of FIG. 11.
Figure 13:
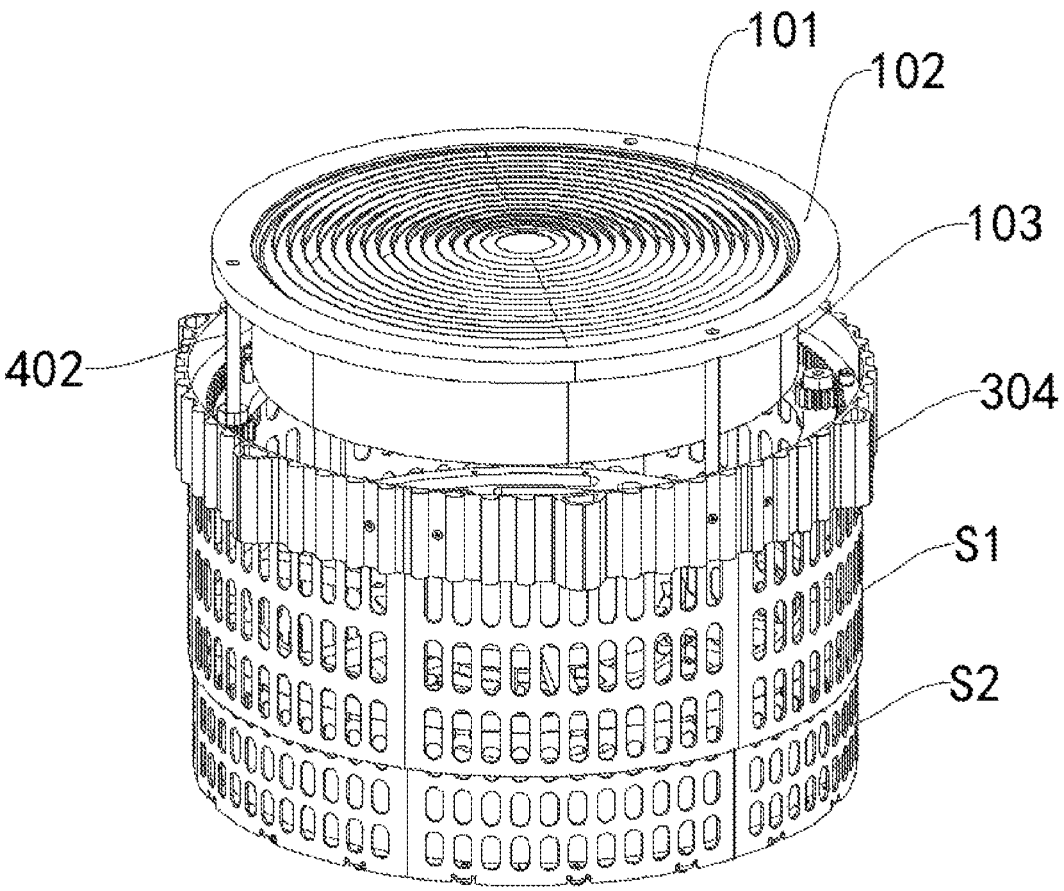
FIG. 13 is a view of a zoom device in an extended state provided by an embodiment of the present disclosure.

Referring to FIG. 9 to FIG. 12, FIG. 9 is a first view of a zoom device 01 in a contracted state provided by an embodiment of the present disclosure, FIG. 10 is a second view of a zoom device 01 in a contracted state provided by an embodiment of the present disclosure, FIG. 11 is a sectional view of a zoom device 01 in a contracted state provided by an embodiment of the present disclosure, and FIG. 12 is a partial enlarged diagram of a zone Z of FIG. 11.

In a condition that the zoom device 01 is in a contracted state, the first lens assembly 10 is closest to the first gear assembly 30, and the connecting frame 20 is closest to the first gear assembly 30. At this time, the second gear assembly 40 is in a contracted state and pulls the first lens assembly 10 closer to the first gear assembly 30; the third gear assembly 50 is also in a contracted state too and pulls the connecting frame 20 closer to the first gear assembly 30.

The connecting frame 20 is provided with a through hole H. The through hole H is configured to allow the first transmission rod 402 of the second gear assembly 40 to pass through during a contraction process of the zoom device 01, so as to prevent position interference.

The second gear 401 of the second gear assembly 40 and the third gear 501 of the third gear assembly 50 are cooperate with the first gear 301 of the first gear assembly 30 respectively, to realize rotational transmission. The second gear 401 is clamped between the first limiting frame 302 and the second limiting frame 303 of the first gear assembly 30, the third gear 501 is clamped between the first limiting frame 302 and the second limiting frame 303 of the first gear assembly 30, and a position of the second gear 401 and a position of the third gear 501 do not coincide, so as to limit a position of the second gear 401 and a position of the third gear 501.

The zoom device 01 further includes a first housing S1 and a second housing S2. The first housing S1 is fixedly connected with the second limiting frame 303 of the first gear assembly 30, the second housing S2 is fixedly connected with the connecting frame 20, the connecting frame 20 may be located inside the second housing S2, and the first housing S1 is slidable relative to the second housing S2. A size of the first housing S1 is larger than a size of the second housing S2; it can be understood that, the first housing S1 is outside, the second housing S2 is inside, and there is a gap between the first housing S1 and the second housing S2; when the zoom device 01 is in a contracted state, the second housing S2 retracts to an inner space of the first housing S1.

Both the first housing S1 and the second housing S2 are provided with a plurality of penetrating hole structures to enhance a heat dissipation ability of the zoom device 01. Moreover, the hole structures of the first housing S1 and the second housing S2 may be arranged in an array along a circumferential direction of the first housing S1 and the second housing S2 respectively, the hole structures of the first housing S1 and the hole structures of the second housing S2 have a same shape and are arranged correspondingly. In a condition that the zoom device 01 is in a fully contracted sate, the hole structures of the first housing S1 and the hole structures of the second housing S2 are aligned with each other. Alternatively, shapes of the hole structures of the first housing S1 and that of the hole structures of the second housing S2 are oval. Of course, the shape of the hole structures may also be circular, hexagonal, or octagonal, which are not limited here, as long as heat dissipation can be realized.

The zoom device 01 further includes a second lens assembly 60 fixedly connected with the connecting frame 20 and a clamping seat 70. The second lens assembly 60 is disposed in a center of the connecting frame 20, and the clamping seat 70 is connected with the connecting frame 20 or the second lens assembly 60. It can be understandably that, the clamping seat 70 may be directly fixedly connected with the connecting frame 20, of course the clamping seat 70 may also be directly fixedly connected with the second lens assembly 60 without being directly connected with the connecting frame 20, for example, the clamping seat 70 is fixedly connected a peripheral fixing frame of the second lens assembly 60. The clamping seat 70 is located on a side of the second lens assembly 60 away from the first lens assembly 10, and the clamping seat 70 is configured to be connected with the light body 02.

Moreover, the second lens assembly 60 may include a first convex lens 602 and a second convex lens 604. A radius of the first convex lens 602 is greater than a radius of the second convex lens 604, and the first convex lens 602 and the second convex lens 604 are arranged sequentially along a direction from the first lens assembly 10 to the clamping seat 70. It can be understood that, the second lens assembly 60 may further include a second lens frame 601. The second lens frame 601 is fixedly connected with the connecting frame 20 and is located in the center of the connecting frame 20, and the first convex lens 602 is fixed on the second lens frame 601, wherein a central axis of the first convex lens 602 coincides with a central axis of the first lens 101. Further, the second lens assembly 60 further includes a third lens frame 603 fixedly connected with the second lens frame 601 and a second convex lens 604 is fixedly connected with the third lens frame 603, and a central axis of the second convex lens 604 coincides with the central axis of the first convex lens 602. Moreover, the second convex lens 604 is closed to the clamping seat 70, the first convex lens 602 is located at a side of the second convex lens 604 away from the clamping seat 70, and the first convex lens 602 is not in contact with the second convex lens 604. Of course, in other embodiments, the first convex lens 602 and the second convex lens 604 may also be replaced with other types of lenses, for example, the first convex lens 602 and the second convex lens 604 both are concave lenses, or both are concave-convex lenses, or a combination of above lenses, etc.

The clamping seat 70 is disposed with a bayonet 701, and the bayonet 701 is configured to be connected with the light body 02. Light emitted by the light body 02 emits inside the zoom device 01 through the clamping seat 70, and then sequentially emits to the second convex lens 604, the first convex lens 602, and the first lens 101, so as to realize adjustment of a focal length of light.

Figure 14:
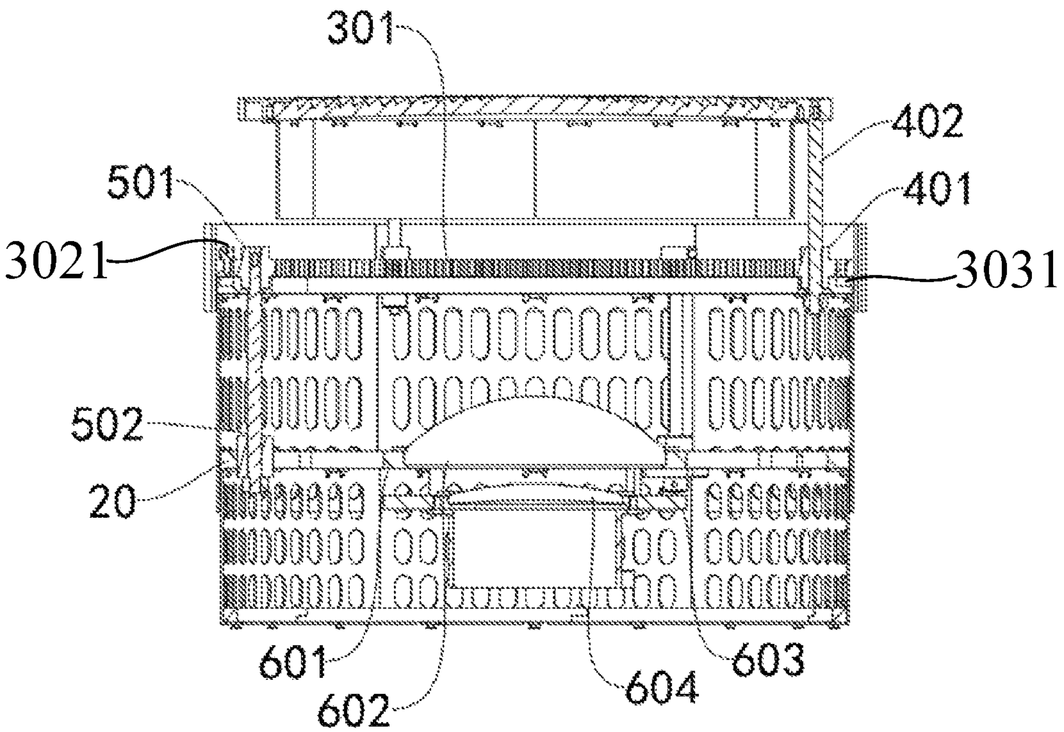
FIG. 14 is a sectional view of a zoom device in an extended state provided by an embodiment of the present disclosure.
Figure 15:
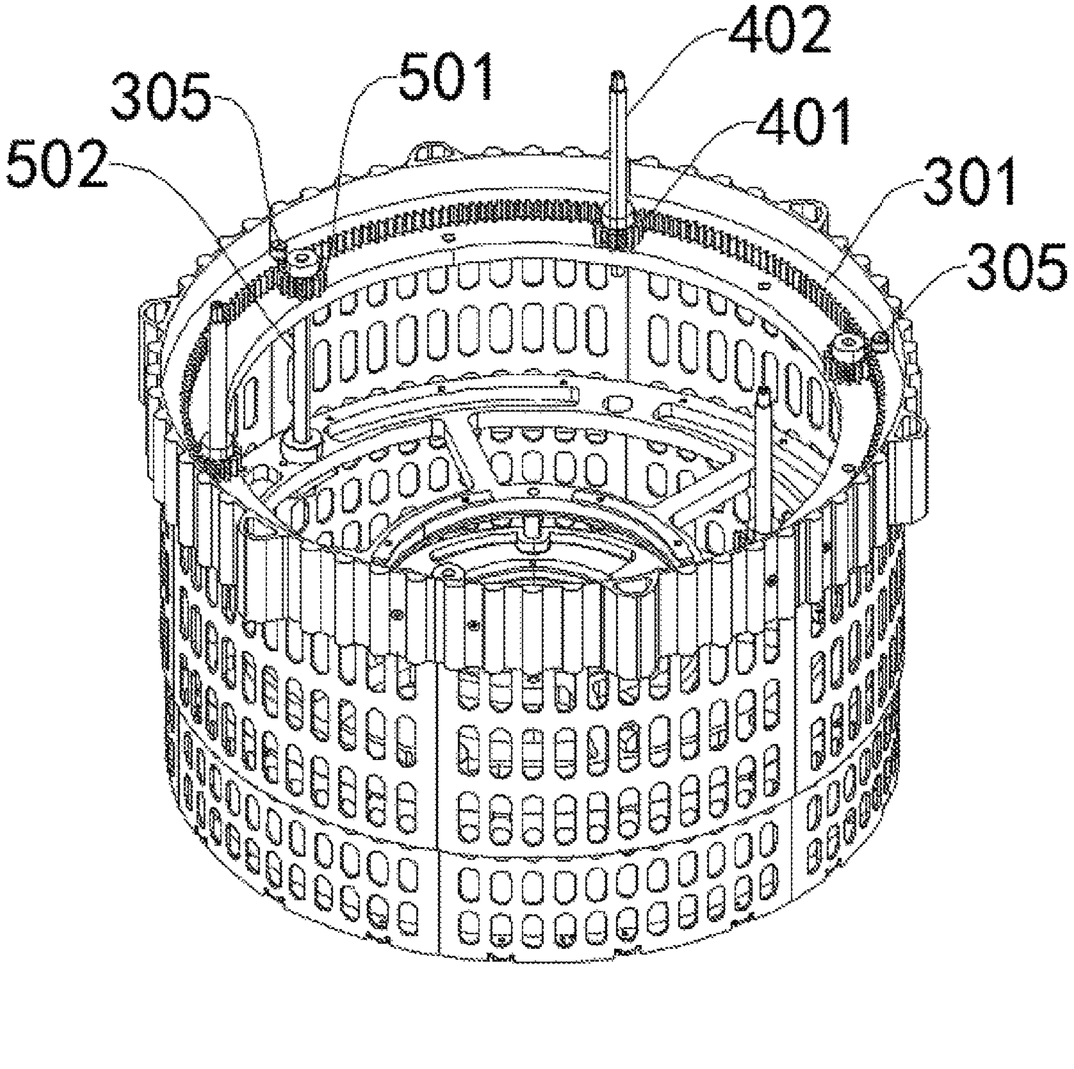
FIG. 15 is a partial structural schematic diagram of a zoom device in an extended state provided by an embodiment of the present disclosure.
Figure 16:
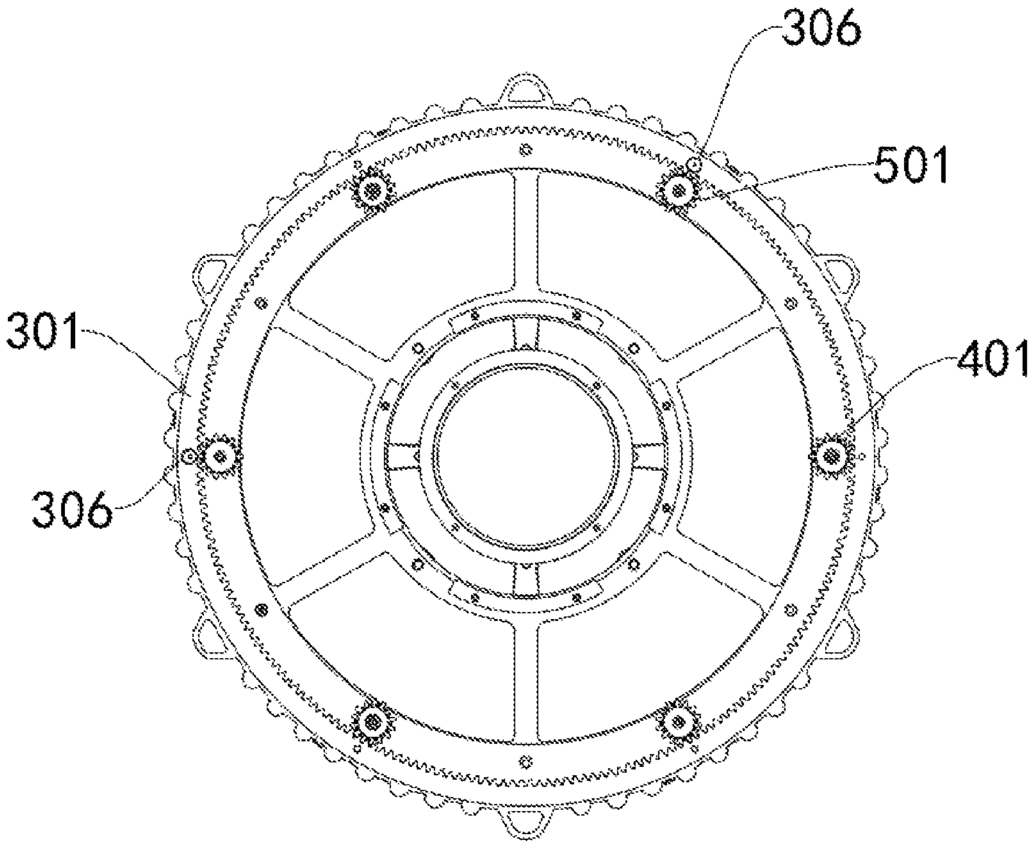
FIG. 16 is a partial perspective diagram of a zoom device provided by an embodiment of the present disclosure.

Referring to FIG. 13 to FIG. 16, FIG. 13 is a view of a zoom device 01 in an extended state provided by an embodiment of the present disclosure, FIG. 14 is a sectional view of a zoom device 01 in an extended state provided by an embodiment of the present disclosure, FIG. 15 is a partial structural schematic diagram of a zoom device 01 in an extended state provided by an embodiment of the present disclosure, and FIG. 16 is a partial perspective diagram of a zoom device 01 provided by an embodiment of the present disclosure.

In a condition that the zoom device 01 is in an extended state, a distance between the first lens assembly 10 and the first gear assembly 30 reaches a maximum, and a distance between the connecting frame 20 and the first gear assembly 30 also reaches a maximum. At this time, the second gear assembly 40 is in an extended state, so as to increase the distance between the first lens assembly 10 and the first gear assembly 30; the third gear assembly 50 is also in an extended state, so as to increase the distance between the connecting frame 20 and the first gear assembly 30. The light-shading assembly 103 extends or protrudes out of the interior of the zoom device 01, to shield a gap between the first lens assembly 10 and the first gear assembly 30, so as to prevent light leakage in this area. And in a condition that the zoom device 01 is in the extended state, the second housing S2 extends out from an inner side of the first housing S1.

The second gear 401 of the second gear assembly 40 and the third gear 501 of the third gear assembly 50 cooperate with the first gear 301 of the first gear assembly 30 respectively to realize the rotational transmission. The second gear 401 and the third gear 501 are both circular external gear structures, the first gear 301 is a circular internal gear structure, and the second gear 401, the third gear 501, and the first gear 301 realize the rotational transmission through a meshing relationship between the internal gear structure and the external gear structure.

A side of the first limiting frame 302 facing the first gear 301 is provided with a first groove 3021, a side of the first gear 301 facing the first limiting frame 302 is provided with a first follower 305, and the first follower 305 is disposed in the first groove 3021 of the first limiting frame 302. The first follower 305 moves along a side surface of the first groove 3021 and moves with the first gear 301, so as to limit a motion path of the first gear 301.

A side of the second limiting frame 303 facing the first gear 301 is provided with a second groove 3031, a side of the first gear 301 facing the second limiting frame 303 is provided with a second follower 306, and the second follower 306 is disposed in the second groove 3031 of the second limiting frame 303. The second follower 306 moves along a side surface of the second groove 3031 and moves with the first gear 301 to limit the motion path of the first gear 301. Under a combined action of the first limiting frame 302, the second limiting frame 303, the first follower 305, and the second follower 306, a rotational space of the first gear 301 is limited to ensure that the first gear 301 rotates stably in a fixed position.

Alternatively, the first follower 305 may be a bearing or a rotating member formed by connecting a rotating ring with a fixed shaft. A bearing surface of the first follower 305 is in contact with a side surface of the first groove 3021 close to the first gear 301. In at least one embodiment, the bearing surface of the first follower 305 is in contact with a side surface of the first groove 3021 close to the adjusting sleeve 304. The second follower 306 may be a bearing or a rotating member formed by connecting a rotating ring with a fixed shaft. A bearing surface of the second follower 306 is in contact with a side surface of the second groove 3031 close to the first gear 301. In at least one embodiment, the bearing surface of the second follower 306 is in contact with a side surface of the second groove 3031 close to the adjusting sleeve 304.

In some embodiments, the zoom device 01 includes a plurality of the second gear assemblies 40 and a plurality of the third gear assemblies 50, and the plurality of second gear assemblies 40 and the plurality of third gear assemblies 50 are alternately disposed at intervals on the circumferential direction of the first gear assembly 30, and there is one third gear assembly 50 between every two adjacent second gear assemblies 40. Alternatively, the plurality of second gear assemblies 40 and the plurality of third gear assemblies 50 are equally spaced disposed on the inner circumference of the first gear assembly 30, that is, a distance between the each adjacent second gear assembly 40 and third gear assembly 50 is equal.

A number of the first follower 305 located on a side of the first gear 301 close to the first limiting frame 302 is a plurality, and the plurality of first followers 305 are equally spaced along the circumferential direction of the first gear 301. A number of the second follower 306 located on the side of the first gear 301 close to the second limiting frame 303 is also a plurality, and the plurality of second followers 306 are equally spaced along the circumferential direction of the first gear 301. Alternatively, the number of the first follower 305 is equal to a number of the second gear assembly 40, and the number of second follower 306 is equal to a number of the third gear assembly 50.

In other embodiments, the number of the second gear assembly 40 included in the zoom device 01 is 3, the number of the third gear assembly 50 included in the zoom device 01 is 3, the 3 second gear assemblies 40 and the 3 third gear assemblies 50 are alternately distributed along an inner circumferential surface of the first gear 301, and there is one third gear assembly 50 disposed between every two adjacent second gear assemblies 40. Alternatively, the 3 second gear assemblies 40 and the 3 third gear assemblies 50 are equally spaced along the inner circumferential surface of the first gear 301, that is, a distance between each adjacent second gear assembly 40 and the third gear assembly 50 is equal.

Alternatively, the number of the first follower 305 located on the side of the first gear 301 close to the first limiting frame 302 is 3, and the 3 first followers 305 are equally spaced along the circumferential direction of the first gear 301. The number of the second follower 306 located on the side of the first gear 301 close to the second limiting frame 303 is also 3, and the 3 second followers 306 are equally spaced along the circumferential direction of the first gear 301.

In summary, the zoom device 01 provided by the embodiment of the present disclosure includes a first lens assembly 10, a connecting frame 20, a first gear assembly 30 disposed between the first lens assembly 10 and the connecting frame 20, a second gear assembly 40 disposed between the first lens assembly 10 and the first gear assembly 30, and a third gear assembly 50 disposed between the first gear assembly 30 and the connecting frame 20. The first gear assembly 30 includes a first gear 301, the second gear assembly 40 includes a second gear 401 rotatably connected with the first gear 301 and a first transmission rod 402 fixedly connected with the first lens assembly 10. The second gear 401 and the first transmission rod 402 are rotatably connected with each other. The third gear assembly 50 includes a third gear 501 rotatably connected with the first gear 301, and a second transmission rod 502 rotatably connected with the connecting frame 20. The third gear 501 is fixedly connected with the second transmission rod 502. The embodiment of the present disclosure realizes synchronous extension and contraction of each mechanism located on two sides of the first gear 301 during a focusing process of the zoom device 01 by the rotational connection of the second gear 401 and the first transmission rod 402 and of the second transmission rod 502 and the connecting frame 20, and in combination with the rotational transmission relationship between the first gear 301, the second gear 401, and the third gear 501. Meanwhile, a focusing distance of the zoom device 01 is increased, a problem of focus lags during the focusing process is alleviated, and fluency and efficiency of focusing is improved, so that the zoom device 01 is suitable for focusing processing of a large-size lighting device.

Figure 17:
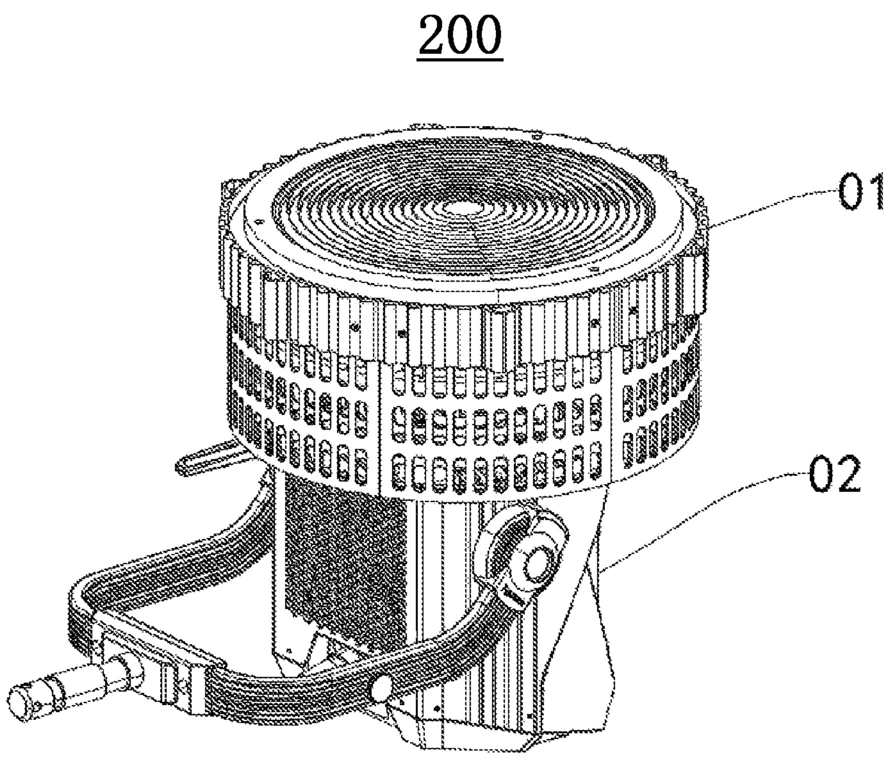
FIG. 17 is a structural schematic diagram of a lighting device provided by an embodiment of the present disclosure.

The present disclosure further provides a lighting device 200. Referring to FIG. 17, the lighting device 200 includes a zoom device 01 and a light body 02 fixedly connected with the zoom device 01. The zoom device 01 is selected from the zoom device 01 recorded in the above embodiment of the present disclosure. A light output terminal of the light body 02 faces the light output side A of the zoom device 01. For structural features of the zoom device 01, please refer to the records of the above embodiment, which will not be repeated here. Because the lighting device 200 provided by the embodiment of the present disclosure includes the zoom device 01 provided by the present disclosure, it can meet the lighting design scheme of large size and high power, and the focusing process of the lighting device 200 is stable, and the focusing efficiency is high.

It should be noted that, although the present disclosure discloses the above specific embodiments, while the above embodiments are not intended to limit the present disclosure. Those of skill in the art can make various changes and refinements without departing from the spirit and scope of the present disclosure. Therefore, a scope of protection of the present disclosure shall be subject to the scope defined in the claims.

What is claimed is:

1. A zoom device, comprising a light output side, wherein the zoom device comprises:

a first lens assembly disposed close to the light output side;

a connecting frame disposed at a side of the first lens assembly away from the light output side;

a first gear assembly disposed between the first lens assembly and the connecting frame, wherein the first gear assembly comprises a light transmitting area in communication with the light output side;

a second gear assembly disposed at a side of the first gear assembly facing the light transmitting area, wherein the second gear assembly meshes with the first gear assembly, and the second gear assembly is further connected with the first lens assembly; and a third gear assembly disposed at a side of the first gear assembly facing the light transmitting area, wherein the third gear assembly meshes with the first gear assembly, and the third gear assembly is further connected with the connecting frame;

wherein the third gear assembly and the second gear assembly are disposed at interval along a circumferential direction of the first gear assembly, and the first gear assembly is configured to drive the second gear assembly and the third gear assembly to adjust a distance between the first lens assembly and the connecting frame.

2. The zoom device as claimed in claim 1, wherein the first gear assembly comprises an annular first gear, and the first gear is an internal gear;

the second gear assembly comprises a second gear and a first transmission rod rotatably connected with second gear, an end of the first transmission rod is fixedly connected with the first lens assembly, and the second gear meshes with the first gear;

the third gear assembly comprises a third gear and a second transmission rod fixedly connected with the third gear; the connecting frame comprises a transmission part, the second transmission rod is rotatably connected with the transmission part; the third gear meshes with the first gear; and the second gear and the third gear are disposed at interval along a circumferential direction of the first gear and are both external gears.

3. The zoom device as claimed in claim 2, wherein a surface of the second gear in contact with the first transmission rod is provided with a first internal thread, a surface of the first transmission rod in contact with the second gear is provided with a first external thread, the first internal thread matches the first external thread;

a surface of the transmission part in contact with the second transmission rod is provided with a second internal thread, a surface of the second transmission rod in contact with the transmission part is provided with a second external thread, and the second internal thread matches the second external thread; and a rotating direction of the first internal thread is opposite to a rotating direction of the second internal thread.

4. The zoom device as claimed in claim 2, wherein the first gear assembly further comprises a first limiting frame and a second limiting frame, wherein the first limiting frame and the second limiting frame are disposed on opposite sides of the first gear, and the first gear is rotatably connected with the first limiting frame and the second limiting frame, respectively.

5. The zoom device as claimed in claim 4, wherein a side of the first limiting frame facing the first gear is provided with a first groove, a side of the first gear facing the first limiting frame is provided with a first follower, and the first follower is disposed in the first groove; and a side of the second limiting frame facing the first gear is provided with a second groove, a side of the first gear facing the second limiting frame is provided with a second follower, and the second follower is disposed in the second groove.

6. The zoom device as claimed in claim 5, wherein the first follower comprises a bearing, and a bearing surface of the first follower is in contact with a side surface of the first groove close to the first gear; and the second follower comprises a bearing, and a bearing surface of the second follower is in contact with a side surface of the second groove close to the first gear.

7. The zoom device as claimed in claim 4, wherein the zoom device further comprises an adjusting sleeve, a first housing, and a second housing;

the adjusting sleeve is disposed around an outer circumferential surface of the first gear and is fixedly connected with the first gear; and the first housing is fixedly connected with the second limiting frame, the second housing is fixedly connected with the connecting frame; the connecting frame is located inside the second housing, the first housing is located outside the second housing, and there is a gap between the first housing and the second housing.

8. The zoom device as claimed in claim 7, wherein a surface of the adjusting sleeve away from the first gear is provided with a plurality of large protrusions and a plurality of small protrusions, a plurality of small protrusions is disposed between every two adjacent large protrusions, and a height of the large protrusion is greater than a height of the small protrusion.

9. The zoom device as claimed in claim 1, wherein the first lens assembly comprises a first lens and a first lens frame fixedly connected with the first lens, and the first transmission rod is fixedly connected with the first lens frame.

10. The zoom device as claimed in claim 9, wherein the zoom device further comprises a light-shading assembly disposed between the first lens assembly and the first gear assembly, the light-shading assembly is circumferentially disposed along an edge of the first lens, an end of the light-shading assembly is fixedly connected with the first lens frame, and another end of the light-shading assembly extends into an inner side of the first gear assembly.

11. The zoom device as claimed in claim 1, wherein the zoom device further comprises a second lens assembly fixedly connected with the connecting frame and a clamping seat, the second lens assembly is disposed in a center of the connecting frame, the clamping seat is connected with the connecting frame or the second lens assembly, the clamping seat is located on a side of the second lens assembly away from the first lens assembly, and the clamping seat is configured to be connected with a light body.

12. The zoom device as claimed in claim 11, wherein the second lens assembly comprises a first convex lens and a second convex lens, a radius of the first convex lens is greater than a radius of the second convex lens, and the first convex lens and the second convex lens are arranged sequentially along a direction from the first lens assembly to the clamping seat.

13. The zoom device as claimed in claim 1, wherein the zoom device includes a plurality of the second gear assemblies and a plurality of the third gear assemblies, and the plurality of second gear assemblies and the plurality of third gear assemblies are alternately disposed at intervals on the circumferential direction of the first gear assembly.

14. A lighting device, comprising a zoom device and a light body fixedly connected with the zoom device, the zoom device comprises a light output side, and a light output terminal of the light body faces the light output side of the zoom device, wherein the zoom device comprises:

a first lens assembly disposed close to the light output side;

a connecting frame disposed at a side of the first lens assembly away from the light output side;

a first gear assembly disposed between the first lens assembly and the connecting frame, wherein the first gear assembly comprises a light transmitting area in communication with the light output side;

a second gear assembly disposed at a side of the first gear assembly facing the light transmitting area, wherein the second gear assembly meshes with the first gear assembly, and the second gear assembly is connected with the first lens assembly; and a third gear assembly disposed at a side of the first gear assembly facing the light transmitting area, wherein the third gear assembly meshes with the first gear assembly, and the third gear assembly is connected with the connecting frame;

wherein the third gear assembly and the second gear assembly are disposed at interval along circumferential direction of the first gear assembly, and the first gear assembly is configured to drive the second gear assembly and the third gear assembly to adjust a distance between the first lens assembly and the connecting frame.

15. The lighting device as claimed in claim 14, wherein the first gear assembly comprises an annular first gear, and the first gear is an internal gear;

the second gear assembly comprises a second gear and a first transmission rod rotatably connected with second gear, an end of the first transmission rod is fixedly connected with the first lens assembly, and the second gear meshes with the first gear;

the third gear assembly comprises a third gear and a second transmission rod fixedly connected with the third gear; the connecting frame comprises a transmission part, the second transmission rod is rotatably connected with the transmission part; the third gear meshes with the first gear;

the second gear and the third gear are disposed at interval along a circumferential direction of the first gear and are both external gears;

a surface of the second gear in contact with the first transmission rod is provided with a first internal thread, a surface of the first transmission rod in contact with the second gear is provided with a first external thread, the first internal thread matches the first external thread;

a surface of the transmission part in contact with the second transmission rod is provided with a second internal thread, a surface of the second transmission rod in contact with the transmission part is provided with a second external thread, and the second internal thread matches the second external thread; and a rotating direction of the first internal thread is opposite to a rotating direction of the second internal thread.

16. The lighting device as claimed in claim 15, wherein the first gear assembly further comprises a first limiting frame and a second limiting frame, wherein the first limiting frame and the second limiting frame are disposed on opposite sides of the first gear, and the first gear is rotatably connected with the first limiting frame and the second limiting frame, respectively;

a side of the first limiting frame facing the first gear is provided with a first groove, a side of the first gear facing the first limiting frame is provided with a first follower, and the first follower is disposed in the first groove;

a side of the second limiting frame facing the first gear is provided with a second groove, a side of the first gear facing the second limiting frame is provided with a second follower, and the second follower is disposed in the second groove;

the first follower comprises a bearing, and a bearing surface of the first follower is in contact with a side surface of the first groove close to the first gear; and the second follower comprises a bearing, and a bearing surface of the second follower is in contact with a side surface of the second groove close to the first gear.

17. The lighting device as claimed in claim 16, wherein the zoom device further comprises an adjusting sleeve, a first housing, and a second housing;

the adjusting sleeve is disposed around an outer circumferential surface of the first gear and is fixedly connected with the first gear;

the first housing is fixedly connected with the second limiting frame, the second housing is fixedly connected with the connecting frame; the connecting frame is located inside the second housing, the first housing is located outside the second housing, and there is a gap between the first housing and the second housing; and a surface of the adjusting sleeve away from the first gear is provided with a plurality of large protrusions and a plurality of small protrusions, a plurality of small protrusions is disposed between every two adjacent large protrusions, and a height of the large protrusion is greater than a height of the small protrusion.

18. The lighting device as claimed in claim 14, wherein the first lens assembly comprises a first lens and a first lens frame fixedly connected with the first lens, and the first transmission rod is fixedly connected with the first lens frame; and the zoom device further comprises a light-shading assembly disposed between the first lens assembly and the first gear assembly, the light-shading assembly is circumferentially disposed along an edge of the first lens, an end of the light-shading assembly is fixedly connected with the first lens frame, and another end of the light-shading assembly extends into an inner side of the first gear assembly.

19. The lighting device as claimed in claim 14, wherein the zoom device further comprises a second lens assembly fixedly connected with the connecting frame and a clamping seat, the second lens assembly is disposed in a center of the connecting frame, the clamping seat is connected with the connecting frame or the second lens assembly, the clamping seat is located on a side of the second lens assembly away from the first lens assembly, and the clamping seat is configured to be connected with a light body; and the second lens assembly comprises a first convex lens and a second convex lens, a radius of the first convex lens is greater than a radius of the second convex lens, and the first convex lens and the second convex lens are arranged sequentially along a direction from the first lens assembly to the clamping seat.

20. The lighting device as claimed in claim 14, wherein the zoom device includes a plurality of the second gear assemblies and a plurality of the third gear assemblies, and the plurality of second gear assemblies and the plurality of third gear assemblies are alternately disposed at intervals on the circumferential direction of the first gear assembly.

* * * * *